United States Patent Office 3,781,246
Patented Dec. 25, 1973

---

3,781,246
PROCESS FOR THE PRODUCTION OF POLYIMIDES BY REACTING A SCHIFF BASE WITH A CYCLIC ACID ANHYDRIDE
Wilfried Zecher, Cologne-Stammheim, and Rudolf Merten, Leverkusen, Germany, assignors to Bayer Aktiengesellschaft, Leverkusen, Germany
No Drawing. Continuation of application Ser. No. 41,680, May 25, 1970, which is a continuation of application Ser. No. 748,209, July 29, 1968, both now abandoned. This application Dec. 3, 1971, Ser. No. 204,774
Claims priority, application Germany, Aug. 7, 1967, F 53,163
Int. Cl. C08g 20/32
U.S. Cl. 260—78 TF                                  2 Claims

---

ABSTRACT OF THE DISCLOSURE

A process for the production of polyimides by reaction of Schiff's bases and cyclic dicarboxylic acid anhydrides at temperatures of from 0 to 450° C.

---

This is a continuation of application Ser. No. 41,680, filed May 25, 1970, now abandoned, which is a continuation of Ser. No. 748,209, filed July 29, 1968 and now abandoned.

The invention relates to a process for the production of polyimides by reaction of Schiff's bases and cyclic dicarboxylic acid anhydrides.

Polyimides which are distinguished by their outstanding resistance to high temperatures, have recently acquired considerable interest, for example as wire lacquers and films or foils in electrical engineering.

One process for the production of polyimides comprises condensing tetracarboxylic acids, or anhydrides thereof, wherein always two carboxylic groups are in positions ortho- to one another, with diamines. Since, however, most polyimides are insoluble in the more common organic solvents, condensation is carried out in two stages in one known process (of DAS 1,202,981). This process is carried out with solutions of polyamide-polycarboxylic acids in anhydrous, strongly polar solvents, such as dimethyl formamide and N-methyl pyrrolidone. Unfortunately, these systems are extremely sensitive, and their practical application involves considerable difficulties because the insoluble polyimides are precipitated, for example through premature cyclisation, or alternatively water eliminated during this reaction promotes disintegration into units of low molecular weight.

It is an object of this invention to provide a process for the production of high molecular weight polyimides, which comprises reacting a Schiff's base of the general formula $$R_1-N=C\begin{matrix}R_2\\ \\R_3\end{matrix}$$
$$|$$
$$X_z$$

wherein $R_1$ represents a $z+1$-valent aliphatic, aliphatic-aromatic or aromatic radical, $R_2$ and $R_3$ each represents hydrogen, or an alkyl, cycloalkyl, aralkyl or aryl radical, or $R_2$ and $R_3$ together with the C-atom to which they are attached, may form a 5- to 7-membered carbocyclic or heterocyclic ring, X represents a grouping selected from the group consisting of

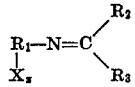, —OH, —NH₂, —COOH, —NCO and —COOR₂ and z represents 1 or 2, with a cyclic acid anhydride of the general formula

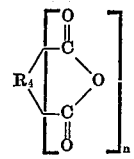

wherein $R_4$ represents a $2n$-valent aliphatic, aliphatic-aromatic or aromatic radical containing one or more additional functional groups that are able to undergo polycondensation or polyaddition reactions and $n$ represents an integer from 1 to 3, said reacting being carried out at temperatures of from 0 to 450° C.

The reaction is preferably carried out from 20 to 350° C. Instead of the Schiff's bases themselves, their trimers may also be used.

One advantage of the process according to the invention that deserves particular emphasis is that the only monomeric volatile compounds that are formed during this reaction are aldehydes or ketones. Thus, in contrast to conventional processes in which imide formation is accompanied by the elimination of water or alcohols, solvolysis of the amide or imide groups, which leads to low molecular weight components and impairs the mechanical properties of the polymers, cannot take place. In addition, the tendency towards foaming and poreformation in cases where fairly thick layers of the reaction mixture are applied, is eliminated because the aldehydes and ketones liberated are more readily soluble in the polymers than water.

The radicals $R_1$ and $R_4$ of the general formula are preferably based on ethane, n-butane, iso-butane, tert.-butane, hexane, eicosane, propene, diethyl ether, dipropyl sulphide, cyclopentane, cyclohexane, benzene, naphthalene, diphenyl, diphenyl methane, diphenyl sulphone, diphenyl ether, 4,4'-diphenoxy diphenyl propane, toluene, o-xylene, m-xylene, p-xylene, tris-tolyl methane, ethylene glycol-bis-phenyl carboxylic acid ester, triaryl phosphate, N,N'-bisphenoxyphenyl hydantoin, polyethers, polyesters, polyacetals, polyureas, polyurethanes, or polyamides. They may either be mono-substituted or poly-substituted, for example by alkyl, halogen, nitro, alkoxy, aryloxy, amino, amido, imido, alkylamino, alkylimino, arylimino, acyl, hydroxy, carboxy, carboalkoxy, carboaryloxy, carbamido, sulphonic acid or cyano groups.

The radicals $R_2$ and $R_3$ are preferably derived from methane, n-butane, iso-butane, tert-butane, dodecane, benzene, naphthalene, toluene, o-xylene, m-xylene, or p-xylene. In addition, $R_2$ and $R_3$ may also represent hydrogen, together may form, for example, a cyclopentane, cyclohexane, cycloheptane or piperidine ring and may be mono-substituted or poly-substituted by alkyl, aryl, alkylamino, arylamino or carboalkoxy groups.

The Schiff's bases used as starting materials in accordance with the invention may be prepared by known methods, for example by the condensation, optionally in the presence of catalysts, of aldehydes or ketones and primary aliphatic, araliphatic or aromatic amines. The Schiff's bases may either be used in substance or alternatively may even be prepared in the reaction medium from amine and oxo-compound. The following are examples of the Schiff's bases which can be used as starting materials in accordance with the invention:
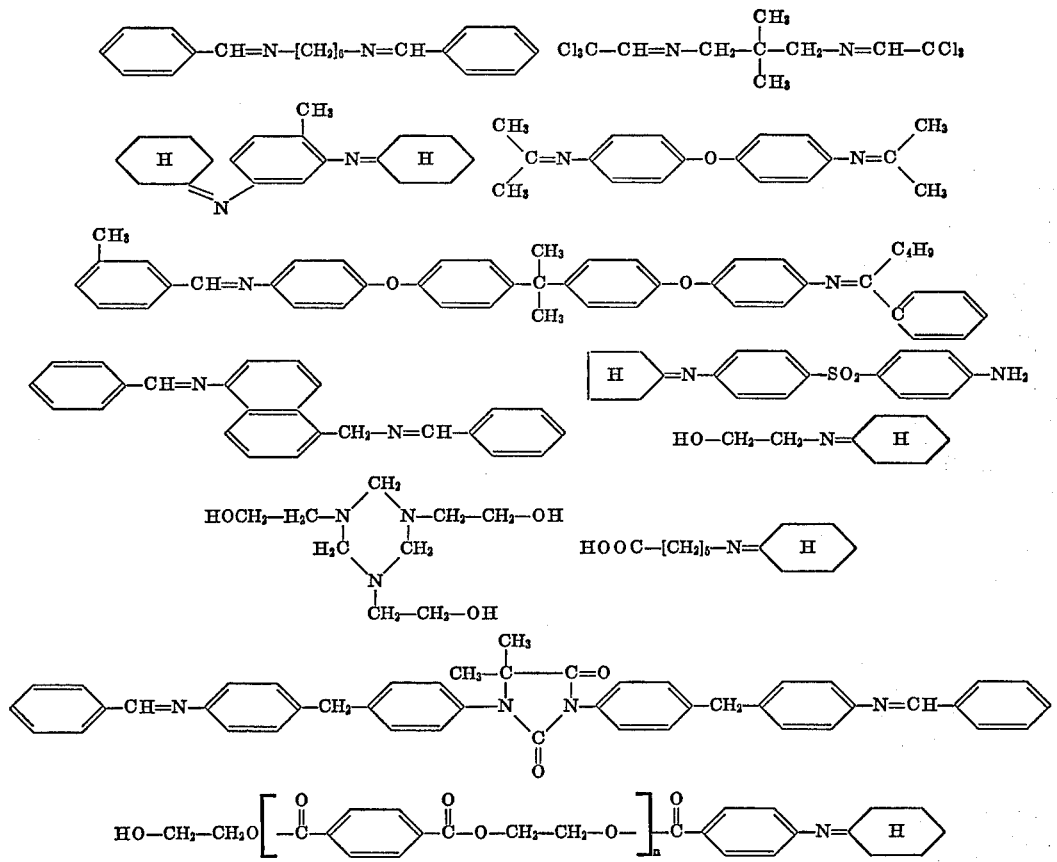
The following are examples of suitable cyclic dicarboxylic acid anhydrides which are also prepared by known methods:
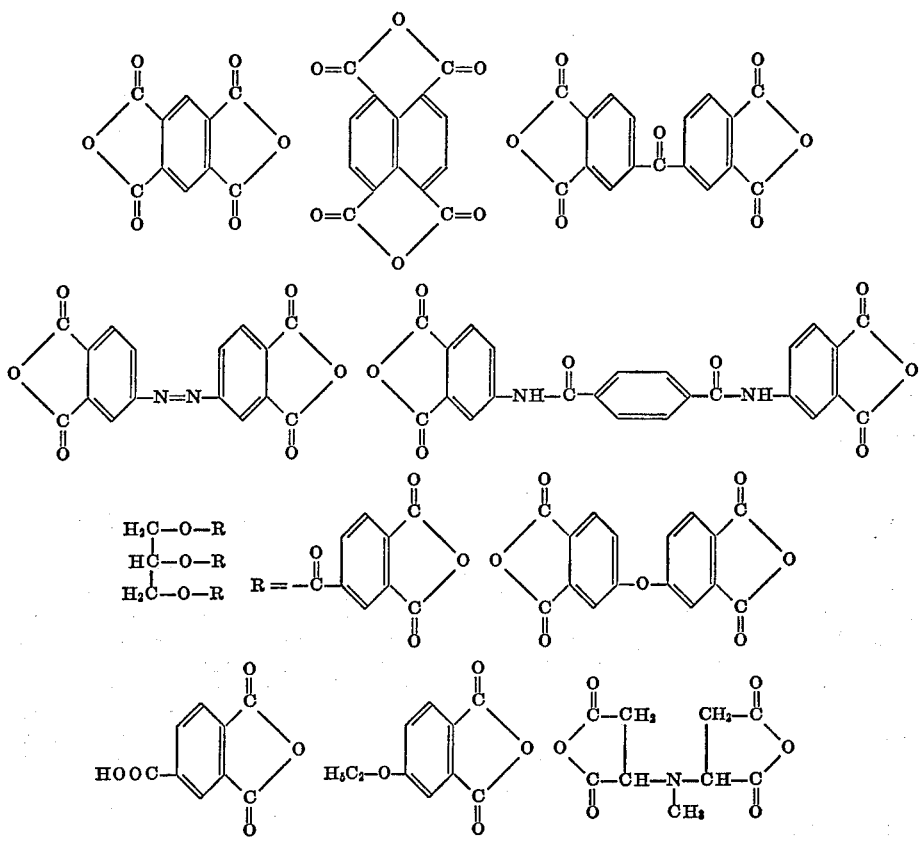

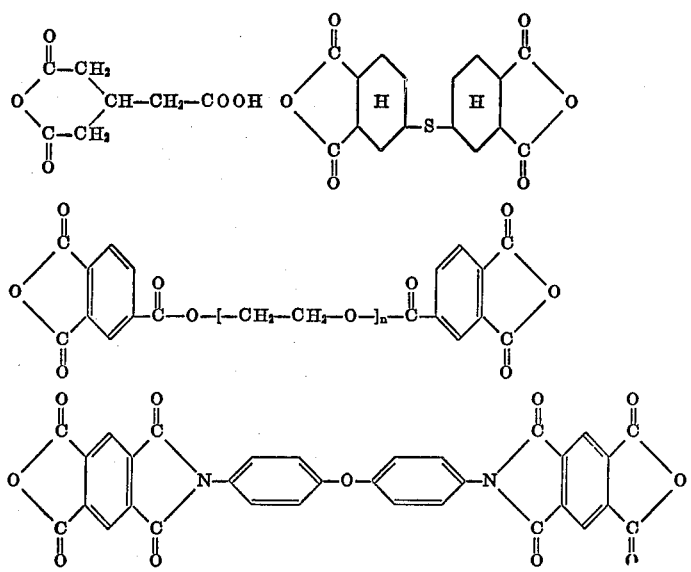

Instead of the cyclic dicarboxylic acid anhydrides, it is also possible to use compounds which can be converted into such anhydrides, for example the phenyl esters of the corresponding dicarboxylic acids.

The reaction according to the invention is illustrated by way of example by the following equation:

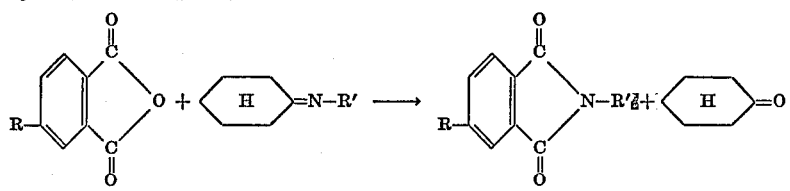

When at least bis-functional Schiff's bases and bis-functional acid anhydrides are used as starting materials, the monomers or oligomers are linked to the high molecular weight compound solely through imide groups. It is also possible, however, to prepare the high molecular weight compounds from one mono-functional and one bis-functional component or from two mono-functional components, although in this instance the components used must contain at least one other reactive group which is able to undergo polycondensation or polyaddition reactions. For example, polyamide imides are obtained from 4,4'-bis-benzylidene imino diphenyl ether and trimellitic acid anhydride, whilst polyimide esters are obtained from cyclohexylideneimino ethanol and trimellitic acid anhydride. An alternative method of synthesising high molecular weight compounds from mono-functional Schiff's bases and cyclic carboxylic acid anhydrides containing a second reactive group, is to add other suitable polyfunctional substances, for example diamines, polyesters or polyethers with terminal OH— or acid groups, diols, triols, polycarboxylic acids or polyisocyanates. For example, a polyimide ester is obtained by the process according to the invention from 4,4'-bis-cyclohexylideneimino diphenyl ether, trimellitic acid anhydride and ethylene glycol.

To carry out the process, the reactants are combined, preferably in solvents that are inert under the reaction conditions. Suitable solvents include hydrocarbons, halogenated hydrocarbons, phenols, esters, ketones, ethers, substituted amides, sulphoxides and sulphones; for example xylene, o-dichlorobenzene, phenol, cresol, acetophenone, ethylene glycol monomethyl ether acetate, N-methyl pyrrolidone, dimethyl formamide, dimethyl acetamide, dimethyl sulphoxide and dimethyl sulphone or mixtures thereof. It may be of advantage to operate in the presence of an inert protective gas, such as nitrogen or argon.

The reaction is generally carried out by keeping the components for periods of from a few minutes up to several hours at a temperature of from 0 to 450° C., optionally in the presence of the solvent. In some cases, it is of advantage to carry out the reaction in several stages, for example where it is desired to apply lacquer coatings. Thus, the first stage carried out in a solvent may be controlled to give an adduct which then, for example after application to a wire or a metal plate, is converted into the polyimide at an elevated temperature at which the solvent evaporates. Schiff's bases substituted by amino groups may be reacted in stages through the amino group and, in the process according to the invention, through the imino group.

The quantitative ratios in which the reactants are used should be as nearly as possible equivalent in order to obtain sufficiently high molecular weights, although deviations from these stoichiometric ratios are also possible. In some instances it is of advantage to influence the course of the reaction by suitable catalysts, for example, boron fluoride and its adducts, ferric chloride, triethylene diamine, zinc octoate, dibutyl-tin-diacrylate, titanium tetrabutoxide, and lead oxide.

The polyimides that can be produced by the process according to the invention are distinguished by their outstanding resistance to high temperatures and are suitable for use as lacquers, films or foils and mouldings. Depending upon the purpose for which they are used, their properties may be varied within wide limits by the addition of fillers pigments and components of low or high molecular weight, for example for the production of wire lacquers by admixture with terephthalic acid polyesters.

The following examples are to further illustrate the invention without limiting it.

EXAMPLE 1

36 g. of 4,4'-bis-cyclohexylideneimino diphenyl ether are dissolved in 230 g. of dimethyl acetamide, and 21.8 g. of pyromellitic acid dianhydride are introduced into the resulting solution, which is kept at room temperature by cooling. A viscous solution is obtained and is applied to a metal plate, being stoved initially at 160° C. and then at 300° C. to form a clear lacquer film. The infrared spectrum shows the bands characteristic of imide groups at 1711 and 1775 cm.$^{-1}$.

EXAMPLE 2

33.8 g. of 1,3-bis-cyclohexylideneimino benzene and 43.6 g. of pyromellitic acid dianhydride are heated for 1 hour at 190° C. in 291 g. of cresol. The cyclohexanone formed during the reaction is distilled off through a distillation bridge. The resulting polyamide is obtained in the form of a yellow powder which is suction filtered after cooling and then washed with ethanol. The yield comprises 87 g.

Calculated for $[C_{16}H_6N_2O_4]_n$ $(290.2)_n$ (percent); C, 66.2; H, 2.1; N, 9.7. Found (percent): C, 66.5; H, 2.3; N, 9.8.

EXAMPLE 3

37.7 g. of 4,4'-bis-benzylideneimino diphenyl ether and 21.8 g. of pyromellitic acid dianhydride are dissolved in 180 cc. of N-methyl pyrrolidone, and the resulting solution is heated for 2 hours at 50° C. The solution is then coated on to a glass plate and stoved initially at 210° C. and then at 350° C. A clear, brown film of lacquer is obtained.

Calculated for $[C_{22}H_{10}N_2O_5]_n$ $(382.3)_n$ (percent): N, 7.3. Found (percent): N, 7.1.

EXAMPLE 4

36.0 g. of 4,4'-bis-cyclohexylideneimino diphenyl ether and 19.2 g. of trimellitic acid anhydride are stirred for 2 hours at 100° C. under a nitrogen atmosphere in 110 g. of N-methyl pyrrolidone. A clear, brown film is obtained after stoving initially at 200° C. and then at 300° C.

Calculated for $C_{21}H_{12}N_2O_4$ (356.3) (percent): N, 7.9. Found (percent): N, 7.7.

The infra-red spectrum shows the bands characteristic of amides at 1661 cm.$^{-1}$, and the bands characteristic of imides at 1711 and 1773 cm.$^{-1}$.

EXAMPLE 5

36.0 g. of 4,4'-bis-cyclohexylideneimino diphenyl ether, 38.4 g. of trimellitic acid anhydride and 63.0 g. of a polyester of terephthalic acid, ethylene glycol and glycerol with a hydroxyl content of 5.5%, are heated for 4 hours at 190° C. in 138 g. of cresol. 0.2 g. of lead-(II)-oxide is then added and the mixture is stirred at 190° C. until a clear viscous liquid has formed. This solution is applied to a metal plate and stoved at 250° C. to form a clear elastic lacquer film.

EXAMPLE 6

9.3 g. of ethylene glycol, 36.0 g. of 4,4'-bis-cyclohexylideneimino diphenyl ether, 38.4 g. of trimellitic acid anhydride and 0.2 g. of lead-(II)-oxide are heated at 190° C. in 83 g. of cresol until a clear, viscous solution has formed. 56 g. of a polyester of terephthalic acid, ethylene glycol and glycerol in 60 g. of cresol, and 6 g. of a 5% by weight solution of titanium tetrabutoxide in cresol are then added, and the mixture is coated onto a glass plate and then stoved initially at 200° C. and then at 300° C. Clear elastic lacquer films are obtained whose infra-red spectra show the bands characteristics of imides at 1714 and 1776 cm.$^{-1}$, and the bands characteristic of esters at 1736 cm.$^{-1}$.

EXAMPLE 7

35.8 g. of 4,4'-bis-cyclohexylideneimino diphenyl methane and 21.8 g. of pyromellitic acid dianhydride are dissolved in 116 g. of dimethyl acetamide and the resulting solution is stirred for 5 hours at room temperature. A viscous solution is obtained which is stoved first at 160° C. and then at 300° C. to form a clear lacquer film.

EXAMPLE 8

29.2 g. of 1,6-bis-benzylideneimino hexane, 19.2 g. of trimellitic acid anhydride and 100 g. of cresol are heated for 2 hours at 100° C. After cooling, a viscous solution is obtained. It is blended with 10 g. of a polyester of terephthalic acid, glycerol and ethylene glycol, and the resulting product is stoved first at 210° C. and then at 250° C. to form a clear lacquer film.

EXAMPLE 9

18.0 g. of 4,4'-bis-cyclohexylideneimino diphenyl ether, 15.5 g. of bis-trimellitic acid anhydride glycol ester and 0.2 g. of lead oxide are heated for 15 hours at 180° C. in 66 g. of cresol. A clear, hard layer of lacquer is obtained by stoving at 200° C. and at 250° C.

EXAMPLE 10

38.4 g. of trimellitic acid anhydride, 28.2 g. of cyclohexylideneimino ethanol and 0.2 g. of lead oxide are stirred in 67 g. of cresol for a period of 5 hours at 60° C., for 5 hours at 120° C. and for 10 hours at 200° C. A hard, brown lacquer film is obtained by stoving at 210° C. and then at 250° C.

EXAMPLE 11

21.9 g. of tris-hydroxyethyl-hexahydro-triazine, 57.6 g. of trimellitic acid anhydride, 0.2 g. of lead oxide and 180 g. of cresol are stirred for 4 hours at 170° C. and then for 6 hours at 200° C. A brown, viscous solution is obtained. The solution thus obtained is mixed with 30 g. of a polyester of terephthalic acid, glycerol and glycol and the resulting mixture is stoved first at 210° C. and then at 250° C. to form a hard elastic lacquer film.

EXAMPLE 12

100 g. of 4,4'-diamino diphenyl ether, 147 g. of cyclohexanone and 150 g. of toluene are boiled in an esterification column until 18 cc. of water have been separated. The toluene and excess cyclohexanone are distilled off in a water jet vacuum, and 910 g. of cresol, 192 g. of trimellitic acid anhydride, 315 g. of a polyester of terephthalic acid, glycerol and ethylene glycol and 1.5 g. of lead oxide are added to the residue. After approximately 20 hours at 190° C., a brown viscous solution is obtained which is stoved in nitrogen at 220° C. and at 330° C. to form a clear elastic lacquer film.

EXAMPLE 13

50 g. of 4,4'-diamino diphenyl methane, 55 g. of a mixture of isomeric and oligomeric amines obtained through the condensation of aniline and formaldehyde, 200 g. of cyclohexanone and 30 cc. of toluene are boiled under reflux in an esterification head until no more water is separated. The solvent is then distilled off in water jet vacuum, the residue is taken up with 400 cc. of dimethyl acetamide, and 109 g. of pyromellitic acid anhydride are introduced with cooling. Stirring is continued for a few hours at room temperature, resulting in the formation of a viscous, brown solution which is stoved on a glass plate at 150° C. and 280° C. to form a clear, elastic film of lacquer.

What we claim is:

1. A process for the production of high molecular weight polyimides, which comprises reacting a Schiff's base of the general formula

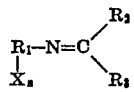

wherein $R_1$ represents a $z+1$-valent aliphatic, aliphatic-aromatic or aromatic radical, $R_2$ and $R_3$ each represents hydrogen, or an alkyl, cycloalkyl, aralkyl or aryl radical, or $R_2$ and $R_3$ together with the C-atom to which they are attached, may form a 5- to 7-membered carbocyclic or heterocyclic ring, X represents a grouping

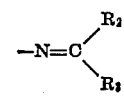

and $z$ represents 1 or 2, with a cyclic acid anhydride of the group consisting of trimellitic acid anhydride, pyromellitic acid anhydride, and bis-trimellitic acid glycol ester said reacting being caried out at temperatures of from 0 to 450° C.

2. The process of claim 1 said reacting being carried out in the presence of a solvent.

References Cited
UNITED STATES PATENTS

| | | | |
|---|---|---|---|
| 3,179,614 | 4/1965 | Edwards | 260—78 X |
| 3,179,630 | 4/1965 | Endrey | 260—78 |
| 3,179,634 | 4/1965 | Edwards | 260—78 |
| 3,277,033 | 10/1966 | Ugi | 260—18 |

OTHER REFERENCES

Journal of American Chem. Soc., vol. 60, 1938, pp. 2025–2027, Synder et al.

Chem. Abstracts, vol. 38, 1944, 5823², Van Alphen.

Chem. Abstracts, vol. 42, 1948, 6760d, Caronna.

Chem. Abstracts, vol. 61, 2372s (index).

HOWARD E. SCHAIN, Primary Examiner

U.S. Cl. X.R.

117—124 E, 132 B, 161 P; 260—30.2, 32.6 N, 33.4 P, 47 CP, 75 N, 857 PA